(12) United States Patent
Babbitt et al.

(10) Patent No.: US 6,250,529 B1
(45) Date of Patent: *Jun. 26, 2001

(54) ALL TERRAIN VEHICLE ANIMAL CONTAINER

(76) Inventors: Gary D. Babbitt, 2315 Claremont Dr.; Randy Witt, 10350 W. Amity Rd., both of Boise, ID (US) 83709; Larry Dowen, Rte. 10, Box 104, Caldwell, ID (US) 83605

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,971

(22) Filed: Jul. 24, 1998

Related U.S. Application Data

(60) Provisional application No. 60/058,051, filed on Sep. 6, 1997.

(51) Int. Cl.[7] .................................................. B62J 9/00
(52) U.S. Cl. .......................... 224/401; 224/433; 224/435; 119/453; 119/482; 119/496
(58) Field of Search ................. 224/401, 42.32, 224/42.33, 452, 454, 456, 433, 434, 435, 413; 119/496, 453, 482, 489; 410/77, 78, 80

(56) References Cited

U.S. PATENT DOCUMENTS

| | | | |
|---|---|---|---|
| 142,978 | * | 9/1873 | Anderson . |
| D. 387,327 | * | 12/1997 | Ethridge ............................. D12/423 |
| 632,997 | * | 9/1899 | Gilkey et al. . |
| 1,550,829 | * | 8/1925 | McBride .......................... 224/42.32 |
| 2,897,781 | * | 8/1959 | Olson ................................. 119/496 |
| 3,490,417 | * | 1/1970 | Swinney .............................. 119/496 |
| 4,052,027 | * | 10/1977 | Taylor ................................... 410/66 |
| 4,596,347 | * | 6/1986 | Hite ..................................... 224/410 |
| 4,917,396 | * | 4/1990 | Meneses et al. ..................... 280/267 |
| 5,076,387 | * | 12/1991 | Oka .................................... 180/215 |
| 5,524,573 | * | 6/1996 | Hart .................................... 119/489 |
| 5,573,162 | * | 11/1996 | Spencer et al. ..................... 224/401 |
| 6,021,936 | * | 2/2000 | Savant ................................ 224/401 |

FOREIGN PATENT DOCUMENTS

538542 * 4/1993 (EP) .................................. 224/32 R

* cited by examiner

*Primary Examiner*—Stephen Castellano

(57) ABSTRACT

A method for mounting an animal container on the rear utility rack of an all terrain vehicle. The container has securement positions adapted to attach the container to the rear utility rack of an all terrain vehicle. There is a hinged door with a securement latch in the front wall of the container.

1 Claim, 15 Drawing Sheets

ALL TERRAIN VEHICLE ANIMAL CONTAINER

This application claims the benefit of Provisional No. 60/058,051 filed Sep. 6, 1997.

BACKGROUND OF INVENTION

1. Field of the Invention

The present invention relates to a method for attaching and mounting an animal container on the rear utility rack of an all terrain vehicle and more particularly pertains to providing storage for all types of animals carried while on an all terrain vehicle.

2. Description of Prior Act

The use of animal kernels is well known in the prior art. Moreover, heretofore devised and utilized for the purpose of live animals and the like are known to prior art and consist basically of familiar, expected and obvious structural configurations, notwithstanding the myriad of designs encompassed by the crowded prior art which have been developed for the fulfillment of countless objectives and requirements. There are, however, no kennels or animal carrying containers in prior art adapted for use on all terrain vehicles.

Edwards et al. U.S. Pat. No. 5,314,239 discloses an all terrain vehicle backrest arranged for mounting to an all terrain vehicle in space adjacent to the vehicle's seat is provided. U.S. Pat No. 5,236,062 to Laney discloses an all terrain vehicle support rack apparatus. The frame assembly includes a rectilinear framework to include fully projecting legs to receive projecting legs of the second frame assembly in an adjustable relationship. Sams U.S. Pat. No. 4,570,986 discloses a combined pickup bumper and tool box. Pru U.S. Pat. No. 4,138,152 discloses a storage box bumper assembly for vehicles. Dent U.S. Pat. No. 3,614,136 discloses a combined bumper and tool box. Sams, Pru and Dent disclose tool boxes attached to the vehicle chassis.

Spencer, U.S. Pat. No. 5,573,162 disclosed a U-shaped utility box for tools designed for mounting only on the front rack of an all terrain vehicle U.S. Pat. No. 2,897,781 to Olson discloses an animal container attached to the trunk door of all automobile by means of adjustable straps with "hook-like members" secured around the edges of the trunk door. U.S. Pat. No. 1,550,829 to McBride discloses an animal "crate" attached to the "running board" of an automobile by means of a clamp with thumb screws. European Patent No. 0538, 542-A1 to Logothetitis discloses a case for carrying an animal on a motorcycle attached by means of slide device mounted on a rack attached to a motorcycle.

The attachment described in McBride further consists of a clamp with thumb screws to fit on a "running board." The attachment described in Olson has a strap with "hook-like member" to fit around the edges of a trunk door. The attachment in Logothetitis discloses a "slide" device mounted to a "support" device which is in turn attached to the motorcycle by means of bolts.

U.S. Pat. No. 5,524,573 to Hart discloses a dog carrier device without any means for attachment to any type of vehicle. U.S. Pat. No. 3,490,417 to Swinney discloses an animal container for holding animals without means for attachment to any vehicle.

The animal container for mounting on the rear rack of an ATV according to the present invention departs from the conventional concepts as shown in the tool box patents such as Sams, Pru, Dent, and Spencer as they do not show either an animal container or secure means of attaching a container for animals while carried on the outside of any vehicle. The animal container in the Hart patent and the Swinney patent disclose devices for holding dogs but without any means for attaching the device to a vehicle.

While these patents fulfill their respective, particular objective and requirements, the aforementioned patents do not describe either a container suitable to transport animals in a container mounted on an ATV or with adequate means to attach the container to the ATV. In particular none of these references disclose a mleans for transporting animals on an ATV.

Animal kennels available commercially are made for transportation inside of vehicle such as automobile, plane or train and are not designed to fit on and attach to the rear utility rack of an all terrain vehicle for off road use. While the commercial animal kennels fulfill their respective particular objective and requirements, those kennels are not suitable by construction or design for mounting on the rear utility rack of an all terrain vehicle and providing transportation for animals.

In this respect, the animal container for an all terrain vehicle according to the present invention departs substantially from the conventional concepts and designs of prior art, and in doing so provides an apparatus developed for the purpose of providing storage and transportation for animals carried in a container which is mounted on the rear utility of an all terrain vehicle. In particular the animal container in the present invention has a method for attachment to securing the container to the ATV sufficient strength to handle the torque and stress of an ATV traversing off road conditions while carrying an animal.

Therefore, it can be appreciated that there exists a continuing need for new and improved animal container which is mounted on the rear utility rack of an all terrain vehicle. In this regard, the present inventor's invention substantially fulfills this need.

SUMMARY OF THE INVENTION

In view of the foregoing disadvantages inherent in the known type of storage boxes and kennels now present in the prior art, the present invention, which will be described in greater detail, is to provide a new method for mounting on an ATV vehicle which has all the advantages of prior art and none of the disadvantages.

To attain this, the present invention essentially comprises a rectangular-shaped container having a closed bottom, a back wall, a top, two side walls, and an open front wall with a hinged rectangular door with a wire mesh panel in the center of the door. The door has two hinges secured to the front wall and a latch to secure the door. The device contains four securement positions. The four securement positions are on the side walls for attaching the animal container to the ATV rear rack. The securement attachments include the following attachment devices: (i) an adjustable strap with hook portion and tightener; (ii) a turnbuckle with hook portion; (iii) a unbolt; or (iv) an elastic strap with a hook portion pivotally secured thereto.

The adjustable strap device has an upper and lower end and upper ends with the lower end of the adjustable strap having a book portions pivotally secured thereto. The upper end of the adjustable strap is secured to the side wall of the animal container. The adjustable strap may be adjusted by a buckle. The turnbuckle device has an upper hook, a double threaded barrel, and a lower hook, each turnbuckle is attached to its respective securement portion by said upper hook which extends through the aperture of the securement portion, the upper hook is threaded at its lower end and the lower hook is threaded at its upper end to attach to the double threaded barrel, the threads on the upper portion of the barrel are reversed from the threads on the lower portion of the barrel so that the length of the entire turnbuckle may be adjusted by turning only the barrel, the lower hook is adapted to engage a portion of a rear utility rack. The U-shaped bolt device is inserted through the bottom wall for attaching the container to an ATV rear rack bar. The U-shaped bolt device is attached to the bottom by means of threading a nut with lock washer on to each end of the U-bolt. The nuts and waters are positioned in four slotted recesses in the bottom wall, thereby securing the animal container to the ATV rear rack. The elastic strap device has an upper end and a lower end. The upper and lower ends have hook portions pivotally secured thereto. The upper ends are secured to the sidewalls of the animal container and the lower ends are secured to the ATV rear rack bar.

There has been outlined, rather broadly, the more important features of the invention in order that the detailed description thereof that follows may be better understood, and in order that the present contribution to the art may be better appreciated. There are, of course, additional features of the invention that will be described hereinafter and which will for the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a method for attaching an animal container to the rear rack of an ATV vehicle which has all the advantages of the prior art storage boxes and animal kennels and none of the disadvantages.

Another object of the present invention is to provide a new and improved animal container which provides in the apparatus and methods of the prior art some of the advantages thereof, while simultaneously overcoming the disadvantages normally associated therewith.

Even still another object of the present invention is to provide a new and improved animal container for attachment to an ATV for storing and transporting animals while carried on an ATV vehicle.

It is an object of the present invention to provide a new and improved attachments for animal container for an ATV vehicle.

BRIEF DESCRIPTION OF DRAWING

The invention will be better understood and objects other than those set forth above will become apparent when consideration is given to the following detailed description thereof Such description makes reference to the annexed drawings wherein.

The same reference numerals refer to the same parts through the various figures.

DESCRIPTION OF THE PREFERRED EMBODIMENT

With reference now to the drawings, and in particular, to FIGS. 1–14 thereof, the preferred embodiment of the new and improved animal container for an all terrain vehicle embodies the principles and generally designates reference number 99 will be described.

Figure 2:
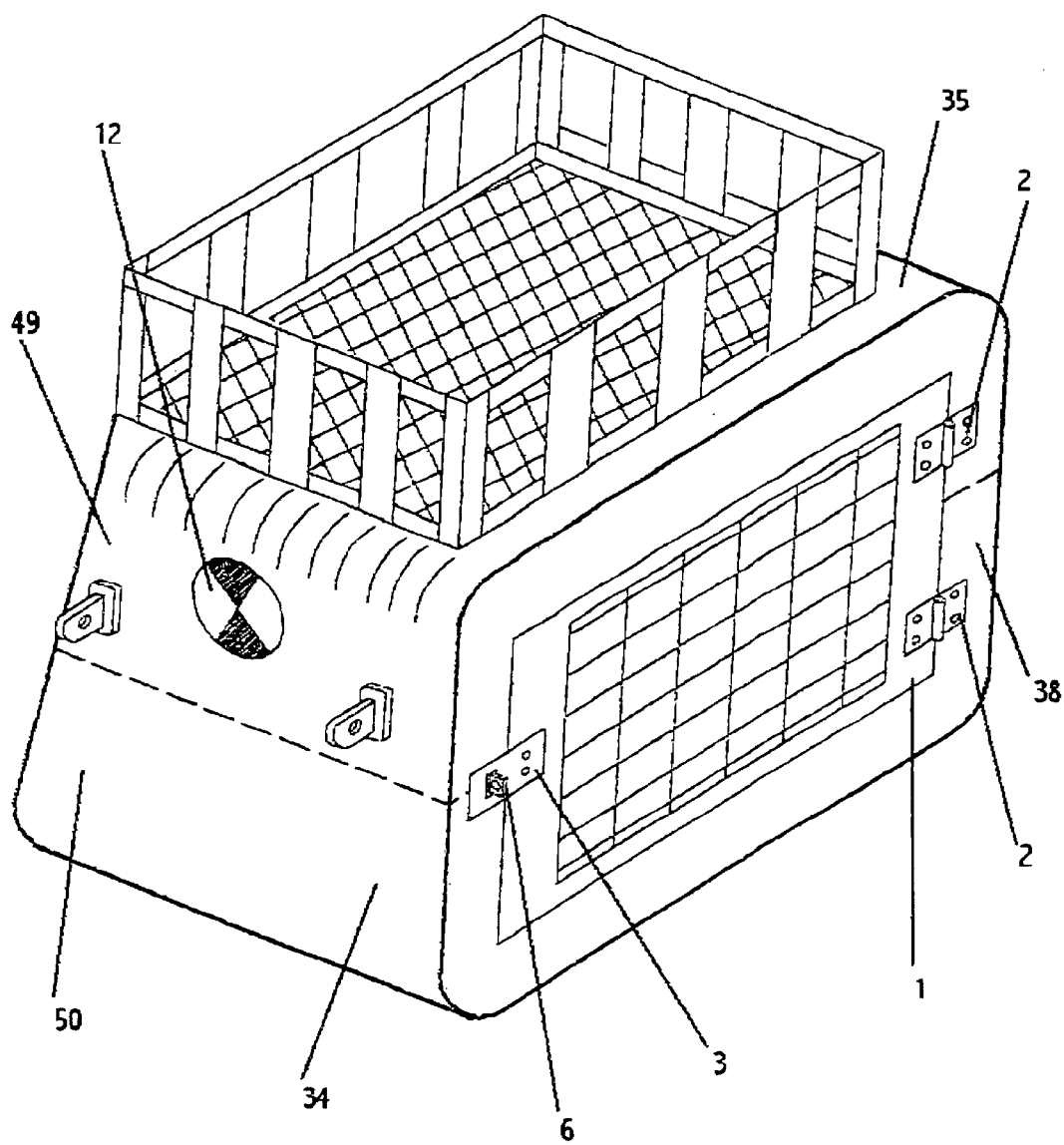
FIG. 2 Front, Top, Door and Side of Animal Container
Figure 3:
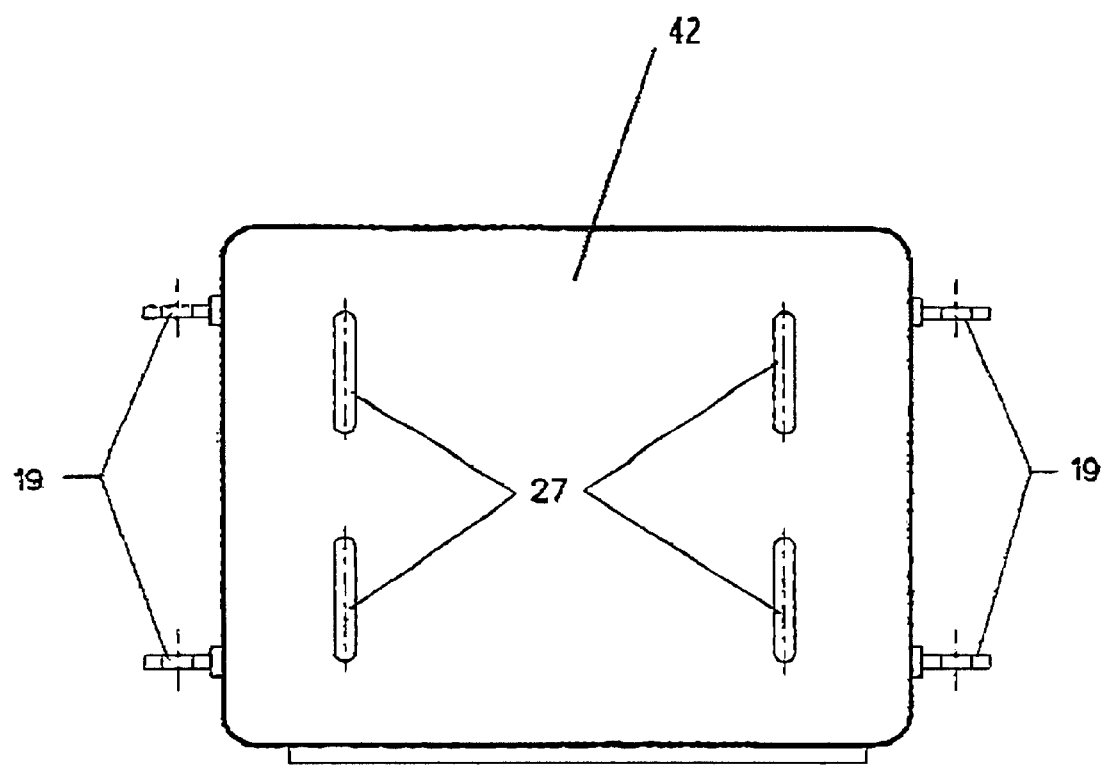
FIG. 3 Bottom of Animal Container
Figure 4:
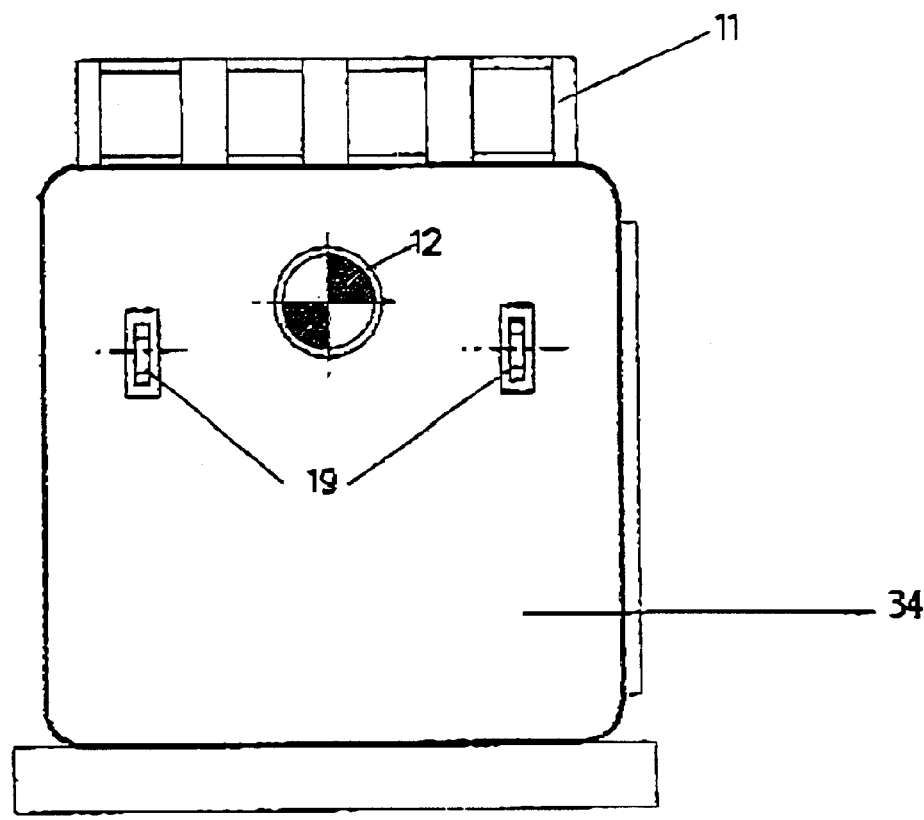
FIG. 4 Side of Animal Container

Specifically, it will be noted in the various figures that the device 99 relates to a new and improved animal container which fits and is secured to the rear utility rack of an ATV for providing storage for animals carried while on an ATV. In its broadest context, the device 99 consists of a geometrically shaped container 33. In FIG. 2, a door portion and four securement positions 19 are shown.

Figure 1:
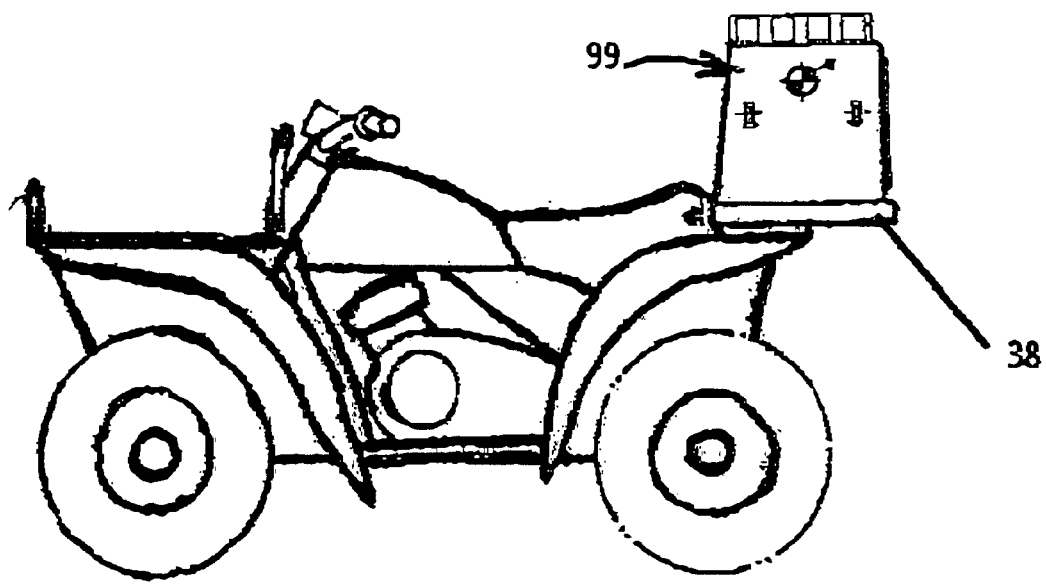
FIG. 1 Profile of Animal Container on all terrain vehicle

In FIGS. 1 and 2 the device 99 is a geometrically shaped container 33, having a horizontal planar bottom wall 42, two vertical planar side walls 34, and a horizontal planar top wall 35, and a vertical planar back wall 36. The front planar wall 38 has a door 1, which is partially screened 37, and which has two hinges 2 and a securement latch 3 secured to the front wall 38 and the door 1. The securement latch 3 has a bracket portion 4 secured to the front wall 38. The bracket portion 4 has an aperture 6 and a securement pivoting device 5 therein, which inserts through the aperture 6 for pivotal engagement thereto.

The device 99 contains a door 1. The door 1 is hinged 2 and thereby secured to the front wall 38, The hinge portion is comprised of a bracket 7 on the door and a bracket 8 on the front wall 38. The door bracket 8 is secured to the outer surface of the door 1 and the front wall 38 by removable screws or rivets 9. There are two hinge positions 2 on the door 1.

Figure 5:
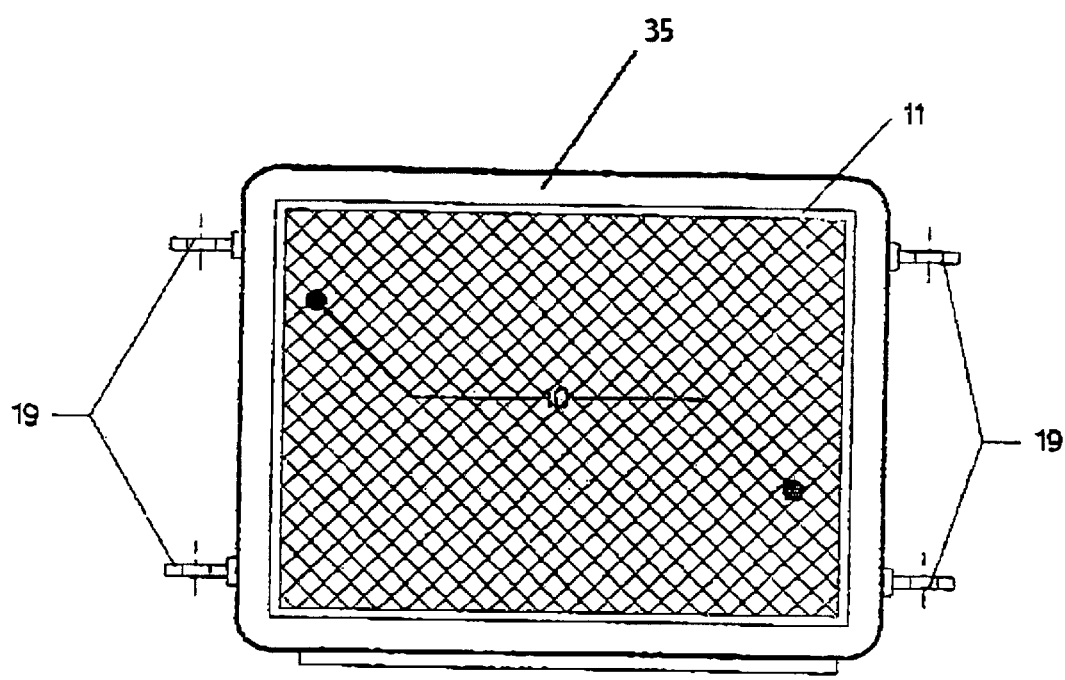
FIG. 5 Hinged Top of Animal Container with Compartment
Figure 6:
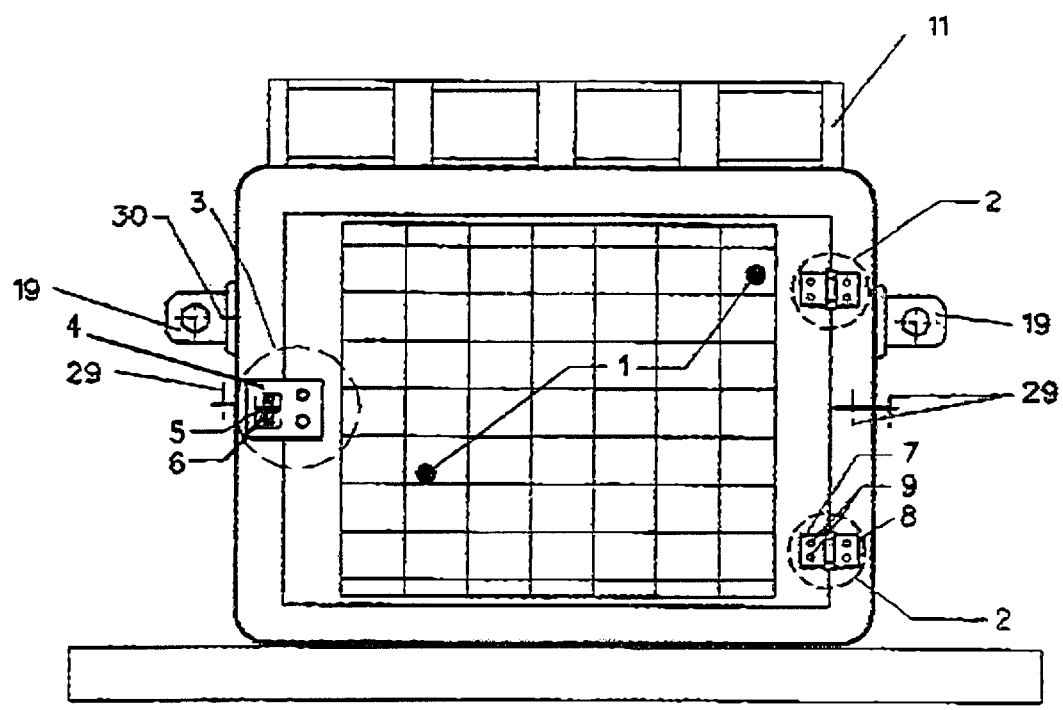
FIG. 6 Front of container with hinged door
Figure 7:
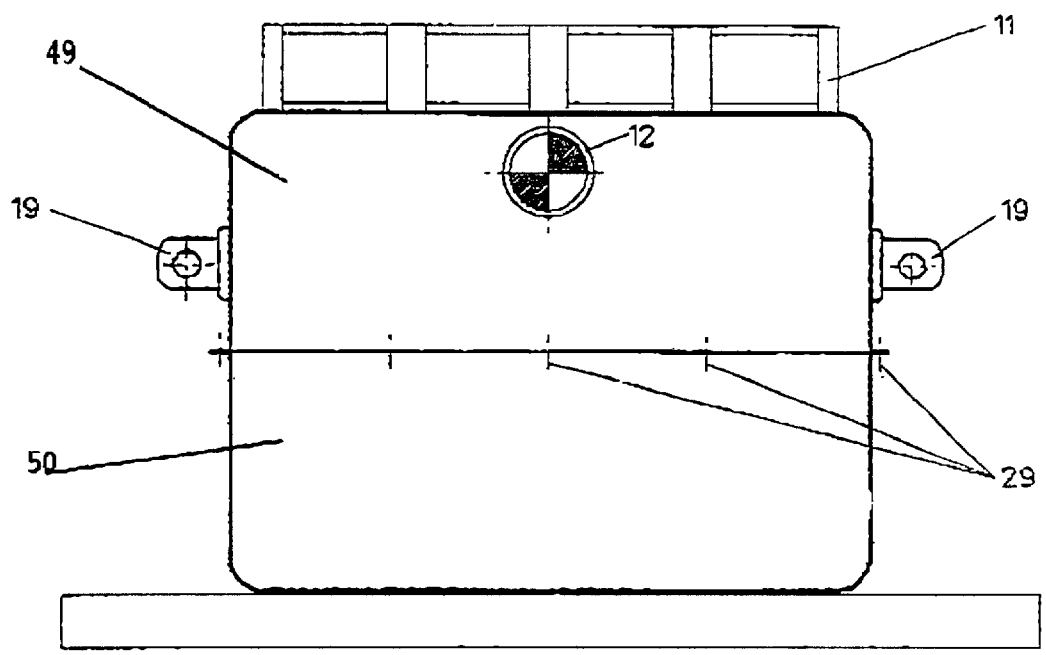
FIG. 7 Profile of Container showing joinder of top and bottom portions.
Figure 8:
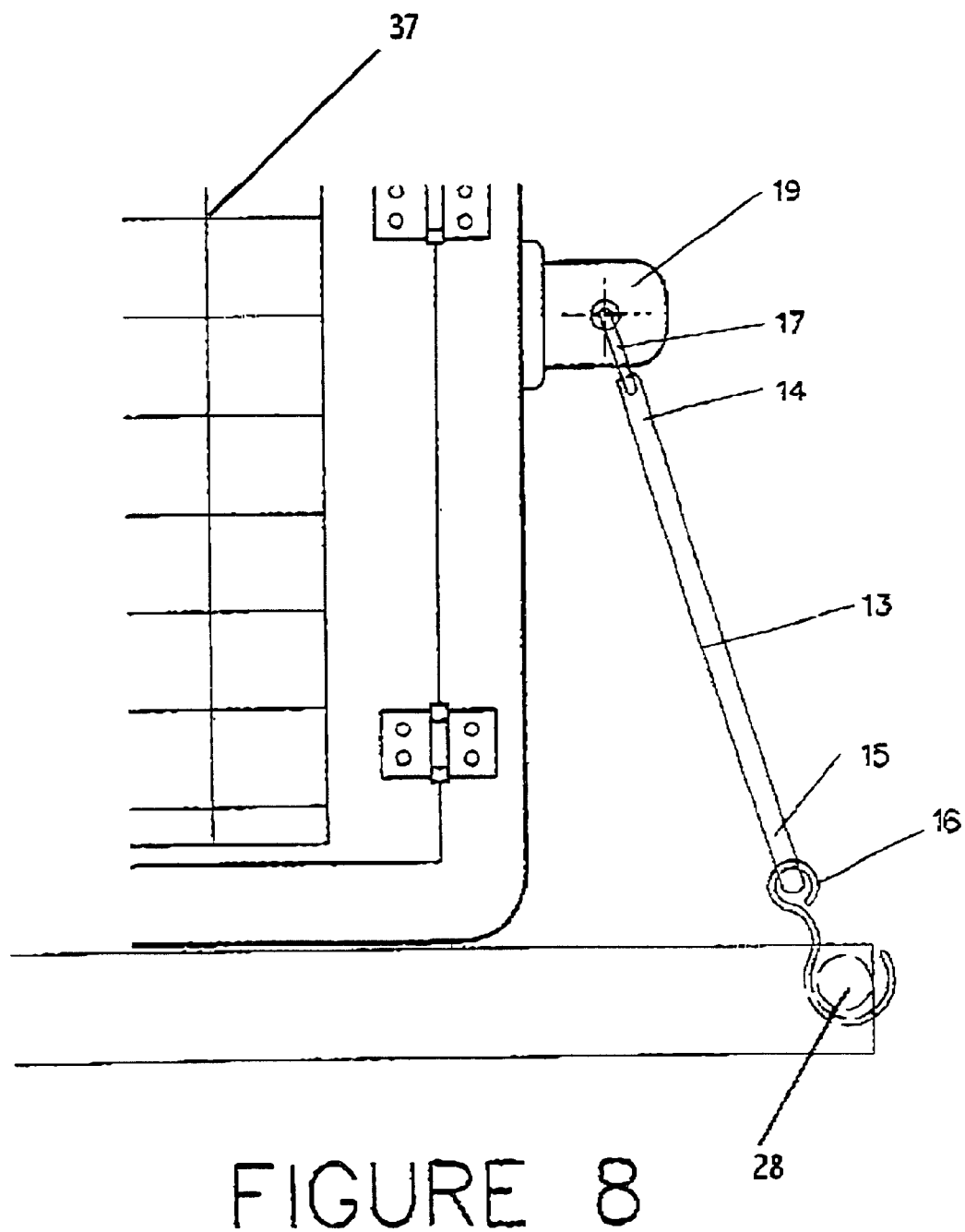
FIG. 8 Elastic Strap Attachment
Figure 9:
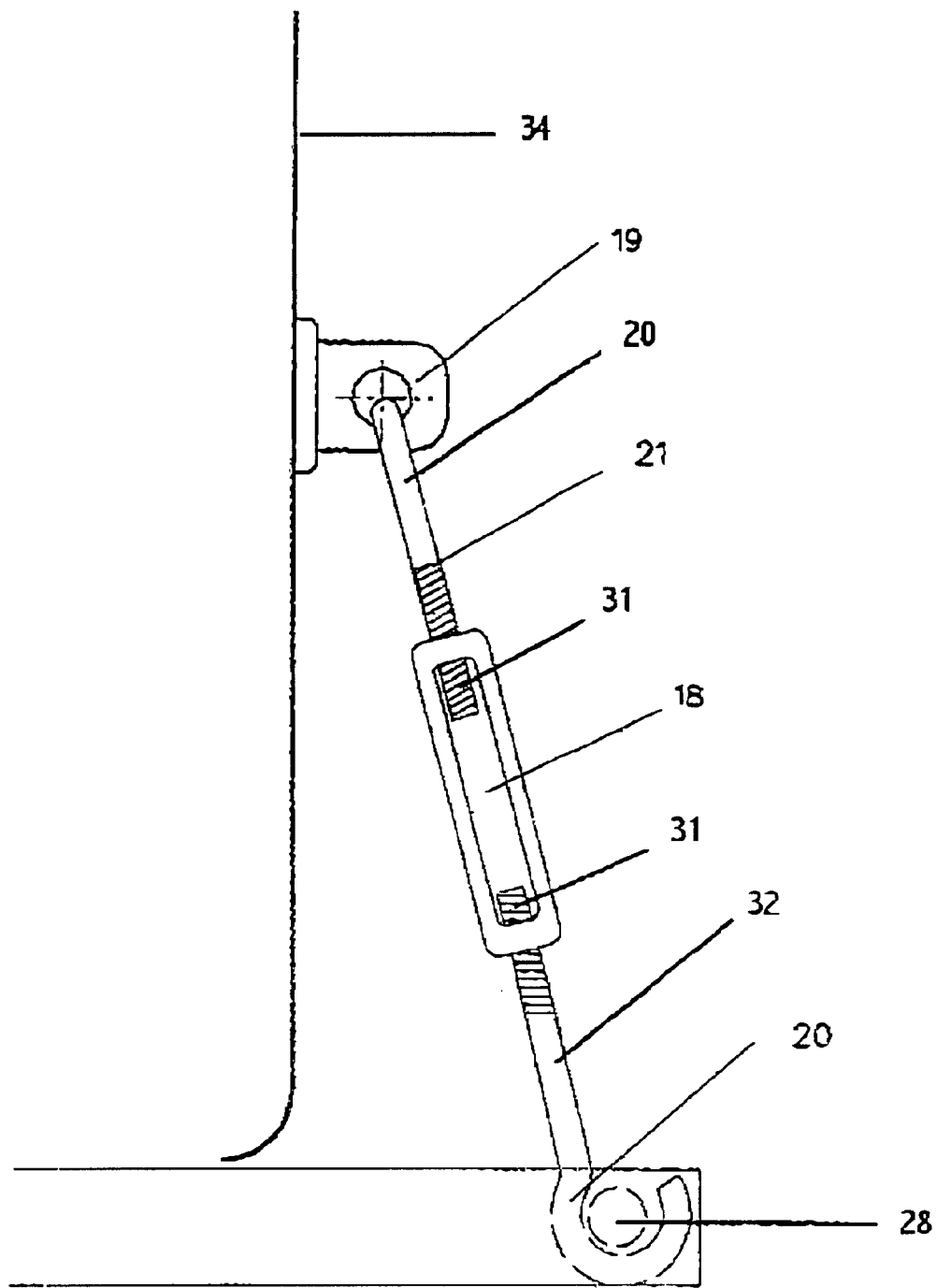
FIG. 9 Turnbuckle Attachment
Figure 10:
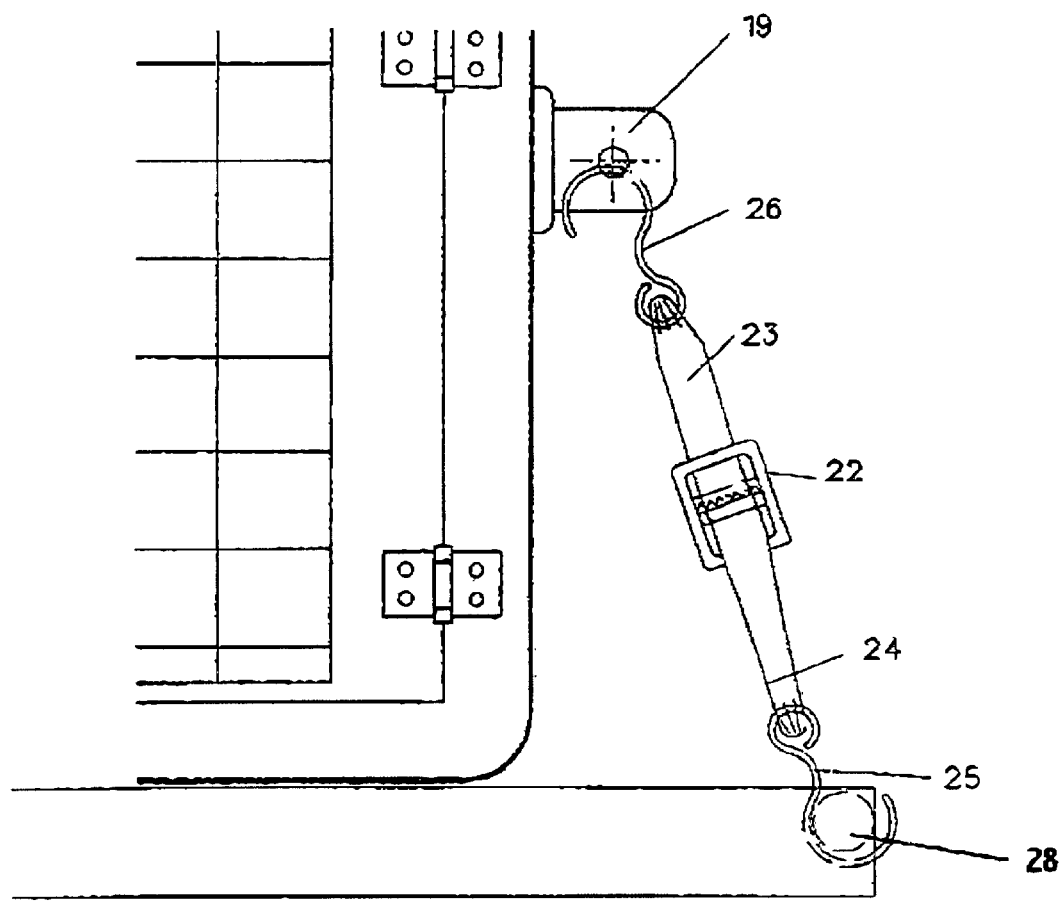
FIG. 10 Adjustable Strap Attachment
Figure 11:
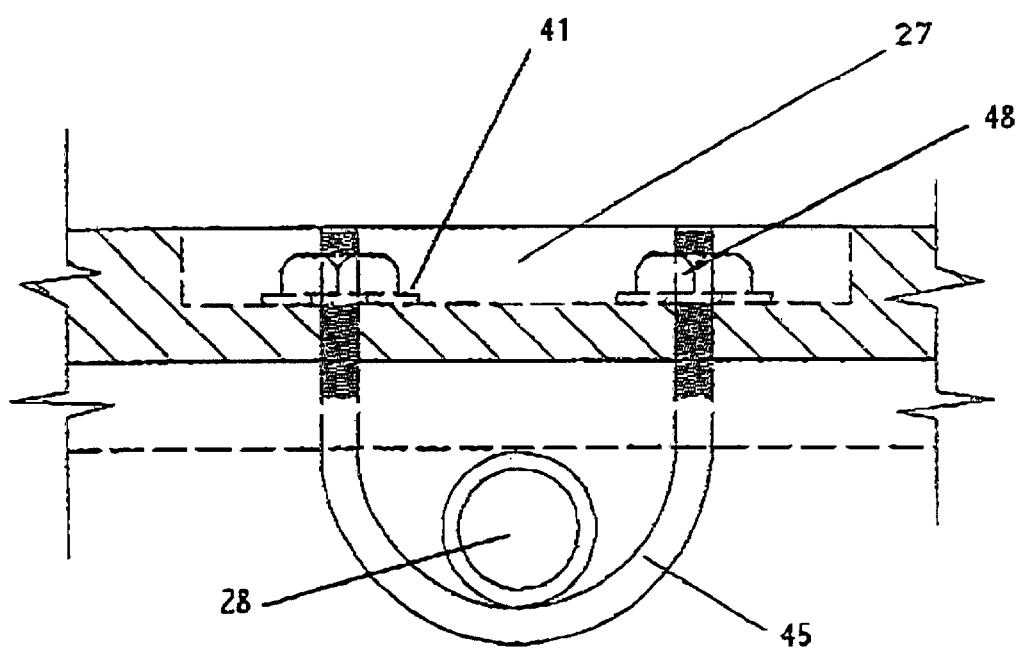
FIG. 11 U-Bolt Attachment
Figure 12:
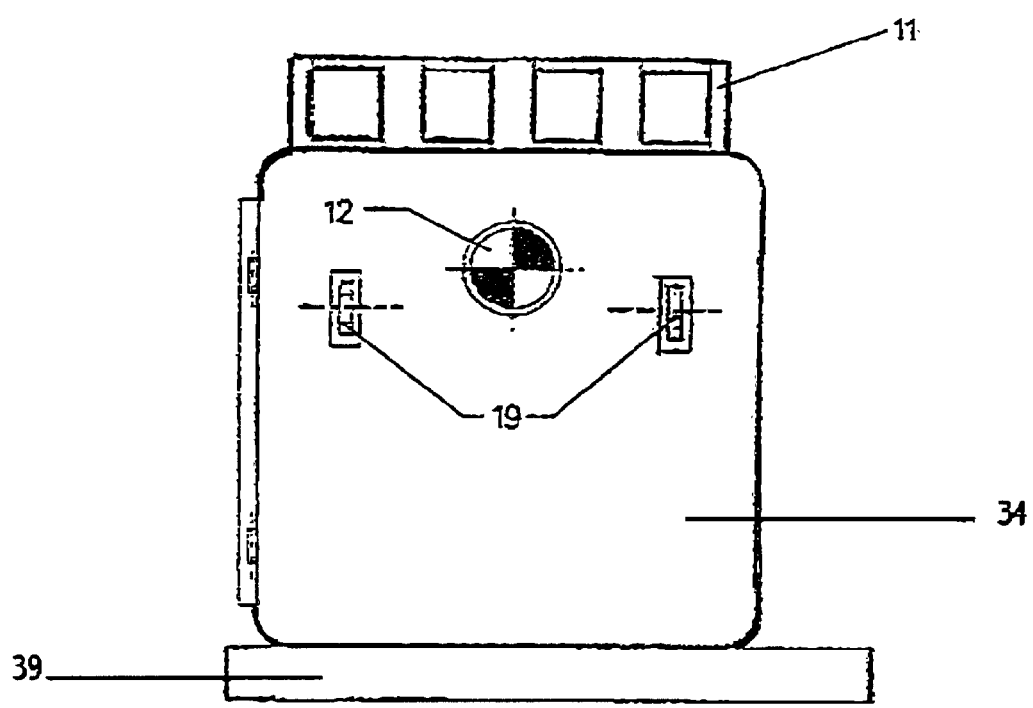
FIG. 12 Profile of container showing vents, attachment positions, and fence
Figure 12A:
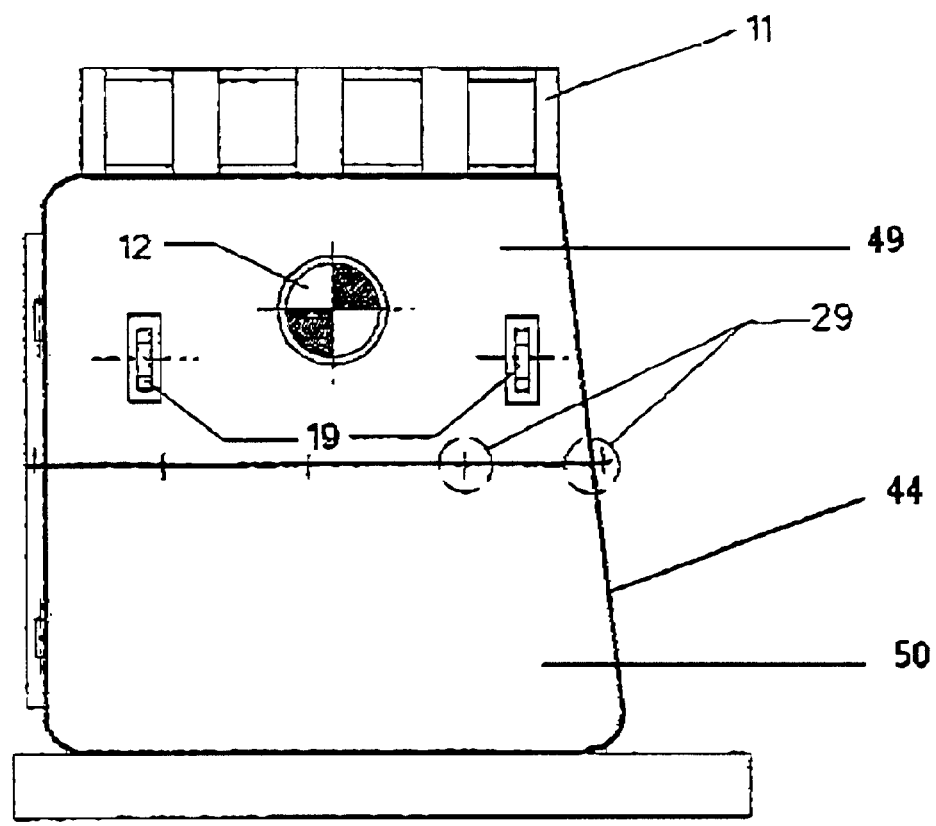
FIG. 12A A Trapezoidal container profile

The upper surface of the top wall 35 has a non-skid surface 10. In FIG. 5, the non-skid surface 10 prevents any objects held thereon from sliding around the top wall 35 of the device 99. The upper surface of the top wall 10 has a fence portion 11 extending around the entire outer periphery thereof. The fence portion 11 contains the objects contained on the upper surface 10 of the top wall 35. The device 99 has vents or screens 12 on the sidewalls 34 and backwall 36.

The device contains four securement portions 19. The four securement portions 19 are adapted to secure the device 99 to a rear utility rack 39 of an ATV.

In a preferred embodiment each of the four securement portions 19 has an elastic strap 13. The elastic strap 13 has an upper end 14 and a lower end 15. The lower end 15 has a hook portion 16 secured thereto. The upper end has a hook portion 17 secured thereto. The upper end hook portion 17 of the elastic strap 13 is secured to each side wall at the securement position 19. The elastic strap 13 allows the four securement positions 19 to be tightly secured to the rear ATV utility rack 39 by limiting the effects from any drastic movements of the device 99 when a user is driving the ATV.

In an alternative embodiment, the device 99 contains four securement positions 19 and each of the securement positions 19 has an aperture. A turnbuckle 40 is secured to the aperture of the securement portion. The lower end of the turnbuckle 32 has a hook portion 20 secured to the ATV rear rack 39. The upper end 21 of the tumbuckle is secured to the sidewalls 34 at a securement position 19. The middle portion 18 of the turnbuckle is threaded 31 for selective adjustment of the upper and lower ends. The four securement positions 19 are adapted to secure the device 99 with a turnbuckle 40 to an ATV rear utility rack bar 28. The turnbuckle 40 allows the four securement positions 19 to be tightly secured to the rear ATV utility rack 39 by limiting any drastic movements of the device 99 when a user is driving the ATV.

In an alternative embodiment, the device 99 contains four securement portions 19 and each of the four securement portions 19 has an adjustable strap 47 with a buckle 22. The adjustable strap 47 with a buckle 22 has an upper end 23 and a lower end 24. The lower end 24 has a hook portion 25 pivotally secured thereto. The middle portion of the adjustable strap 47 contains a buckle 22. The upper end 23 has a hook portion 26 pivotally secured thereto. The upper end of the adjustable strap 23 is secured to a securement position 19 of each side wall of the device 99 by the hook portion 26. The four securement positions 19 are therefore adapted to secure the device 99 to an ATV rear utility rack 39. The adjustable strap 47 allows the four securement positions 19 to be tightly secured to the ATV utility rear utility rack 39 by limiting drastic movements of the device 99 when a user is driving the ATV.

In an alternative embodiment, the bottom wall 42 of the device has apertures 27 to accommodate the U-shaped bolt device 45. A U-shaped bolt device 45 is affixed around an ATV rack bar 28 and inserted through an aperture 27 of the bottom wall. The apertures 27 and U-shaped bolt device 45 are secured by a burr 48 with washer 41 and thereby adapted to secure the device 99 to a utility rear Tack 39 of an ATV. The U-shaped bolt device 45 allows the four apertures 27 in the bottom wall 42 to be tightly secured to the rear rack 39 of an ATV by limiting the effects from any drastic movements of the device 99 when a user is driving the ATV as shown in FIG. 1.

In an alternative embodiment, the device 99 has a trapezoidal shape 44.

Figure 13:
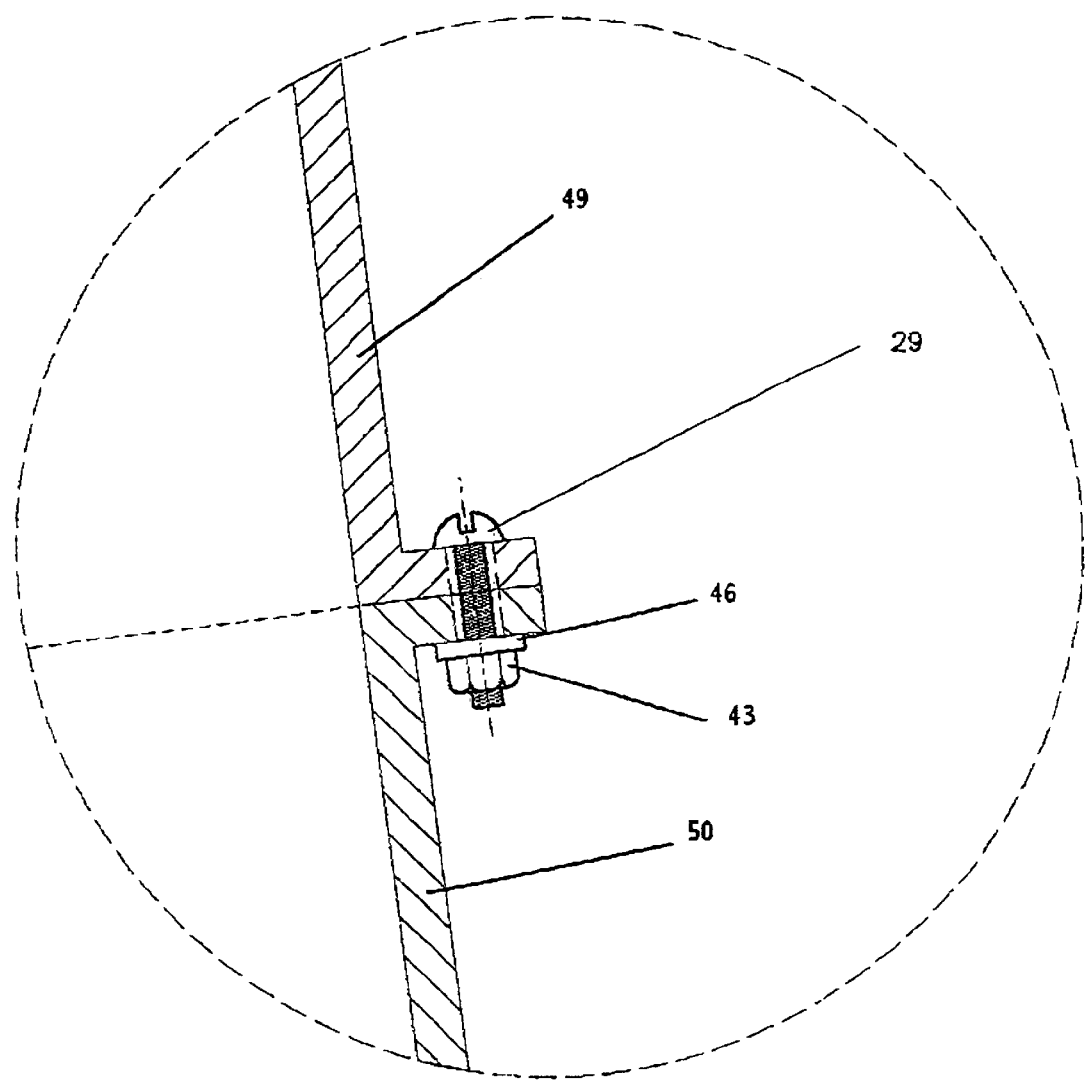
FIG. 13 Securement detail on top and bottom portions.
Figure 14:
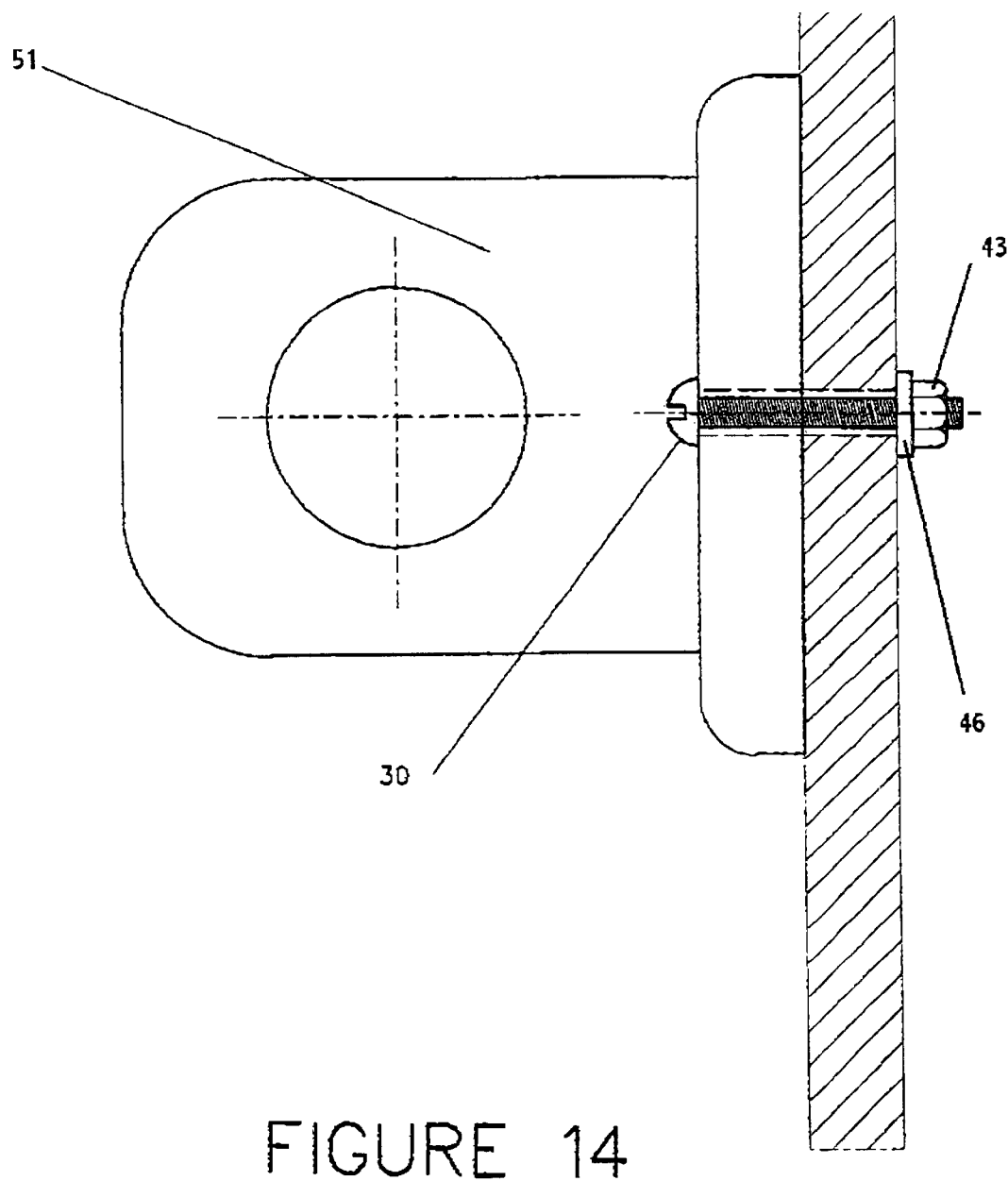
FIG. 14 Removable Attachment

In an alternative embodiment, the device 99 in FIG. 13 has an upper overlapping wall portion 49 and a lower overlapping wall portion 50 secured thereby by bolts 29.

In an alternative embodiment, the device 99 has removable securement positions 51 secured to the container by a bolt 30 with a washer 46 and a burr 43 which facilitates shipping and handling.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

We claim:

1. A container for mounting on rear utility rack of an all terrain vehicle and for holding live animals, said container comprising:

a top wall, a bottom wall, a first side wall, a second side wall, a back wall and a front wall forming a rigid enclosure for containing animals and said container being dimensioned for placement upon a rear utility rack;

said front wall having a door, said door including a plurality of ventilation openings, a plurality of hinges on one side edge and a latch on an opposite side edge;

the upper surface of said top wall has a non-skid surface and the upper surface of said top wall has a fence portion extending upwardly from the upper furnace and extending around the entire periphery of the top wall;

which of the first and second side walls has a plurality of securement portions attached thereto, which of the securement portions has an aperture;

a turnbuckle is attached to each securement portion, each turnbuckle consists of an upper hook, a double threaded barrel, and a lower hook, each turnbuckle is attached to its respective securement portion by said upper hook which extends through the aperture of the securement portion, the upper hook is threaded at its lower end and lower hook is threaded at its upper end to attach to the double threaded barrel, the threads on the upper portion of the barrel are reversed from the threads on the lower portion of the barrel so that the length of the entire turnbuckle may be adjusted by turning only the barrel, the lower hook is adapted to engage a portion of a rear utility rack.

* * * * *